July 13, 1971  A. A. OSWALD  3,592,798
PREPARATION OF POLYTHIOETHER ADDITION PRODUCTS
Filed April 11, 1966

ALEXIS A. OSWALD  INVENTOR

BY

ATTORNEY

United States Patent Office 3,592,798
Patented July 13, 1971

3,592,798
PREPARATION OF POLYTHIOETHER ADDITION PRODUCTS
Alexis A. Oswald, Mountainside, N.J., assignor to Esso Research and Engineering Company
Filed Apr. 11, 1966, Ser. No. 541,696
Int. Cl. C08g 23/00
U.S. Cl. 260—79                                        12 Claims

ABSTRACT OF THE DISCLOSURE

Novel terminal difunctional polythioether polyadducts useful as mastic compositions are prepared by reacting dithiols with acetylenes under free radical conditions. Dependent on the thiol/acetylene ratio, the novel polymers contain thiol and/or vinyl sulfide end groups.

---

Figure 1:
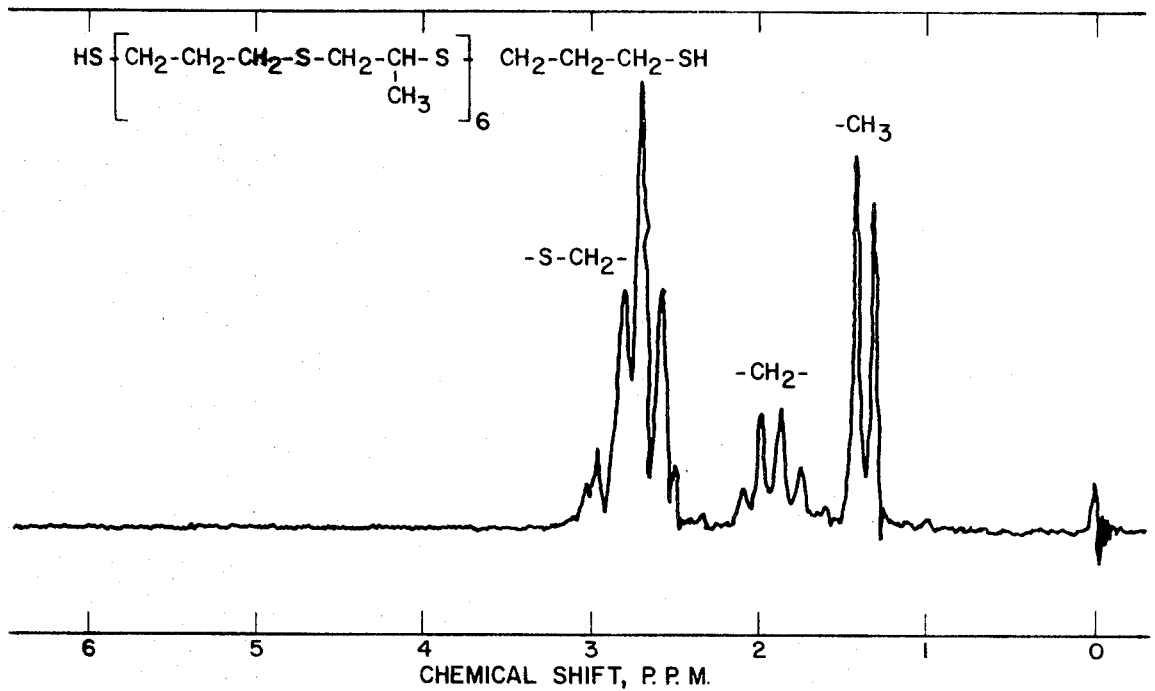

The present invention relates to novel low molecular weight polythiolether addition products, a novel free radical addition process for their formation and to cured mastic compositions formed from said polymers. More particularly, the present invention is directed to low molecular weight polythioethers formed by the addition of dithiols to acetylenic compounds and to vulcanizates formed from said polymers.

The addition of dithiols (dimercaptans) to unsaturated hydrocarbons has been known for some time. For example, Marvel and Chambers, J. Am. Chem. Soc. 70,993 (1948) and Marvel and Cripps, J. Pol. Sci. 8, 313 (1952) reported the reaction of dithiols with conjugated dienes such as butadiene and with dienes having isolated double bonds. However, such reactions proceeded at very slow rates and often resulted in unsaturated thioethers.

In accordance with the present invention, it has been found that polythioether addition products having little or no unsaturation with number average molecular weights varying from about 250 to 200,000 can be formed by the free radical addition of dithiols to acetylenic compounds. The polythioethers formed can be readily crosslinked to attractive vulcanizates. The molecular weight of the polythioether products of such reactions is strongly dependent upon the amounts of dithiol and acetylene compound introduced into the reaction zone and also upon whether the addition reaction is carried out in the presence or absence of a solvent. Surprisingly, it has been discovered that an equal molar ratio of reactants does not serve to secure maximum molecular weight products. High molecular weight polythioethers can be obtained using moderate excess of the acetylene compound. The branched chain structure of the polymers permits their use for elevated temperature applications.

The over-all reactions contemplated by this invention may be represented by the following equations:

(I)  $HSRSH + CH{\equiv}CR' \longrightarrow HS[RSCH_2CHS]_nRSH$
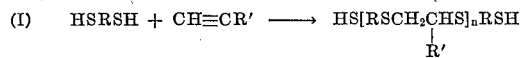

(II)
$HSRSH + CH{\equiv}CR' \longrightarrow HS[RSCH_2CHS]_nRSCH{=}CHR'$
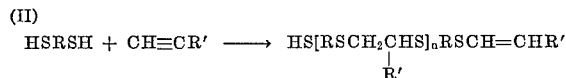

(III)
$HSRSH + CH{\equiv}CR' \longrightarrow$
$R'CH{=}CHS[RSCH_2CHS]_nRSCH{=}CHR'$
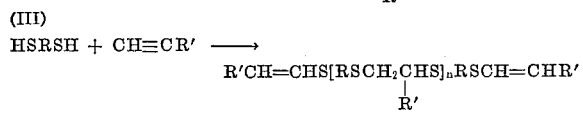

The product of Equation I is the predominant reaction product occurring when equal molar amounts of dithiol and acetylenic compound are reacted and also when an excess of dithiol is used. Minor amounts of the product of Equation II are secured in equimolar reactions and also when a minor excess of the acetylenic compound is used. The product of Equation III is the predominant product of the reaction when a large excess amount of acetylenic compound is used.

The value of "$n$" can vary over a wide range. Generally, "$n$" ranges between 1 and 1000, preferably between 2 and 100. Products finding the greatest utility as the base constituent for mastic compositions exhibit "$n$" values varying from about 3 to 40. The products of this invention are essentially colorless liquids or low melting solids having number average molecular weights varying from 250 to 200,000 preferably between 250 and 20,000.

The dithiol utilized as a starting material in the reaction has the general formula:

$$HSRSH$$

where R is a divalent organic radical particularly divalent hydrocarbon radicals and divalent radicals containing either sulfur, oxygen or silcon in addition to hydrogen and carbon atoms. Preferably, R is (1) a $C_2$–$C_{30}$ divalent alkylene radical, e.g., dimethylene, hexamethylene, etc.; (2) a $C_2$–$C_{30}$ divalent unsaturated alkylene radical such as 2-buten-1,4-ylene, 2-butyne-1,4-ylene, etc.; (3) a $C_8$–$C_{30}$ bis-alkylene substituted aromatic radical, e.g. p-xylylene, p-bis-dimethylenebenzene, etc.; (4) a $C_6$–$C_{30}$ divalent aromatic radical such as m-phenylene, 1,5-naphthylene, etc.; and (5) a $C_2$–$C_{30}$ divalent organic radical containing either sulfur, oxygen or silicon in addition to carbon and hydrogen atoms such as thio-bis-ethylene, oxy-bis-ethylene, thio-bis-trimethylene, thio-bis-ethylthioethylene, dimethyl silane-bis-ethylene, etc.

Particularly preferred thiols are those compounds wherein R is a $C_2$–$C_4$ alkylene radical since such materials are especially reactive and yield polymers of outstanding resistance to autoxidation and hydrocarbon solvents.

The acetylenic compounds useful as starting materials have the general formula:

$$CH{\equiv}CR'$$

wherein R' is a hydrogen radical or a $C_1$–$C_{30}$ hydrocarbon radical. Preferably, R' is (1) a hydrogen radical; (2) a $C_1$–$C_{30}$ alkyl group, e.g. methyl, ethyl, pentyl, etc.; (3) a $C_2$–$C_{20}$ alkenyl radical such as vinyl, allyl, 3-butenyl, etc.; (4) a $C_2$–$C_{30}$ alkynyl radical, e.g. ethynyl, 4-pentynyl; and (5) a $C_7$–$C_{20}$ aralkyl radical such as benzyl, phenylethyl, naphthyl methyl.

Although any of the above-named materials will operate in the process of this invention, it is especially preferred that the R' be a $C_{10}$ group or lower, especially a $C_1$ to $C_4$ alkyl group. Although mono-substituted acetylenes are preferred for use in the instant invention, acetylenic compounds having the general formula:

$$R'C{\equiv}CR'$$

can also be used either alone or in combination with mono-substituted acetylenic compounds.

The ratio of reactants present in the reaction zone has a strong effect upon the molecular weight of the final product. In general, polymers having a number average molecular weight between 500 and 4000 are secured when an equal molar ratio of dithiol to acetylenic compound is present in the reaction zone. Higher molecular weight thiol terminated polythioethers are secured when the molar ratio of thiol compound to acetylenic compound is maintained between about 1:1.01 to 1:1.3.

The desirable amount of excess acetylene is dependent on the conversion of the reactants. For example, in the case of long reaction times resulting in high conversions a smaller excess of the acetylene is recommended to obtain higher molecular weights than at lower conversions. The desirability of excess acetylene is also dependent on the type of the dithiol reactant used. Aliphatic dithiols which have a tendency to form thiol terminated polythioethers are preferably reacted with excess acetylene to obtain higher molecular weights. Aromatic dithiols which produce polythioethers having vinylic sulfide functionality do not require an acetylene excess.

It is believed that the effect of acetylene excess is partially dependent on the relative rates of the addition reactions of the two types of polymer end groups.

(I)

(II)

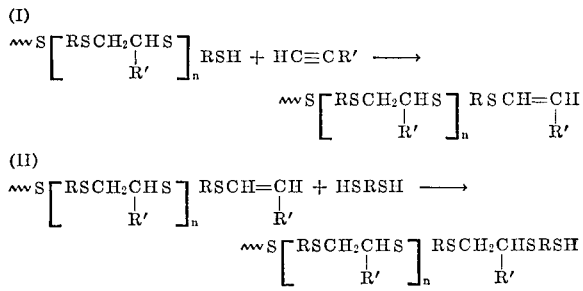

If reaction I involving the acetylene is much slower than a reaction II involving the corresponding vinylic sulfide, a definite excess of the acetylene is beneficial for obtaining higher molecular weight products.

It was also found that the use of a high excess of the dithiol compound in the reaction drastically reduces the molecular weight. For example, the reaction of two moles of a dithiol with one mole of an acetylene yields a bis-thioether dithiol and a tris-thioether-dithiol as the main polyadduct:

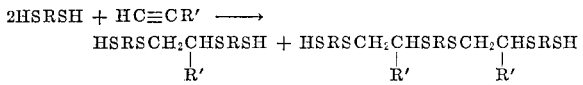

Although the direct use of the above compounds for the preparation of polymer articles is not commercially attractive, they can be advantageously used for the preparation of higher molecular weight polythioetherdithiols by reacting them with further amounts of an acetylene in the next step. For example:

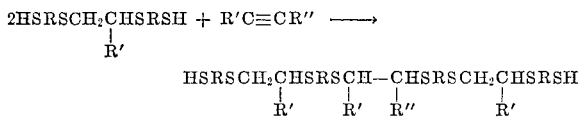

The reaction for the production of the thiol compounds of the present invention can be carried out in bulk, in the presence of inert solvents, or with the use of water emulsion techniques. Low molecular weight polythioether compounds suitable as the base component in a mastic composition can be prepared most efficiently using bulk polymerization techniques, that is, carrying out the addition reaction in the absence of solvents. When higher molecular weight materials are desired, the addition reaction is preferably carried out in the presence of an inert solvent; however, high molecular weight materials can also be secured if the reaction is carried out in a typical water-surfactant emulsion system.

Useful inert solvents include saturated aliphatic hydrocarbons, halogenated saturated aliphatic hydrocarbons, aliphatic ethers, and aliphatic thioethers such as pentane, cyclohexane, dimethyl sulfide, diethyl disulfide, etc. The use of aromatic hydrocarbons as solvents usually results in sharply reduced reaction rates and sometimes leads to undesirable side reactions.

The conditions at which the addition reaction is conducted can vary over a wide range. The temperature and pressure within the reaction zone should be adjusted such that the dithiol and acetylenic compounds are in the liquid state during reaction. For bulk addition reactions, temperatures varying from $-100°$ C. to $175°$ C., preferably $-30$ to $140°$ C. can be used. When the polythioethers are formed in the presence of a solvent, temperatures varying from $-30$ to $+140°$ C., preferably from 0 to $50°$ C. are used. When emulsion techniques are utilized, the reaction should be conducted at temperatures varying from 0 to $50°$ C.

The addition reaction is not critically sensitive to pressure provided that the reaction pressure is sufficient to maintain the reactants in the liquid state at the temperatures of reaction. In general, pressures ranging from 0.5 to 10 atmospheres, preferably from 1 to 5 atmospheres, can be used. In most industrial applications, the pressure within the reaction zone will normally be the autogenous pressures exerted by the reactants.

The reaction time used in the formation of the polymers of this invention is not critical; however, sufficient time should be allowed for the desired monomer conversion which depends upon temperature, reactant concentration, activity of catalyst used, etc. High yields of polythioethers are secured within the temperature and pressure limits set forth above within from 1 to 300 hours.

While not absolutely essential to the process, it is desirable to employ a free radical initiator in the reaction. Radiation such as ultraviolet light, gamma-radiation or heat may be applied to the reactants to promote the addition reaction. Additionally, chemical initiators such as peroxides, azo compounds, etc., may also be used instead of radiation or in combination with it. Ultraviolet and gamma radiation are the preferred initiators for this process although peroxidic initiators such as t-butyl hydroperoxide, bis-t-butyl peroxide, as well as materials such as bis-azobutyronitrile can also be used.

The reaction vessel utilized for the addition reaction can be constructed of any material that is inert to the reactants and catalysts used and is capable of withstanding the operating pressures. Reaction vessels made of stainless steel and glass-lined steel are satisfactory.

Although the addition products of the present invention have many uses as intermediates because of the thiol or vinyl terminal functionality present on the polymers, they find particular utility as the base substituent for mastic compositions. The thiol terminated addition products of this invention can be readily crosslinked to stable rubbery three-dimensional networks using a variety of techniques. For example, the polythioetherdithiol addition products may be oxidatively vulcanized by mixing the polymers with from 1 to 20 grams per 100 grams of polymer of dimethylsulfoxide and heating the total mixture at a temperature varying from 80 to $150°$ C. for a period ranging from 1 to 5 hours. Similarly, the thiol terminated products can be cured by admixing the polymer with an epoxide compound having at least 2 epoxide groups per molecule and heating the mixture in the presence of an amine catalyst for a time sufficient to secure a cured network. Alternatively, these polymeric dithiols may be cured with diisocyanates to produce polythiourethanes. Due to their reactive thiol terminals, they can be also reacted with allylic acrylates, divinyl sulfone, diacrylates and other reactive diolefinic compounds. They can also be cured by reaction with diepisulfides and the like.

Reactions of the polymer of this invention with trifunctional or polyfunctional molecules also lead to three-dimensional polymer networks. For example, the thiol terminated polymers of this invention may be reacted with polybutadiene or the copolymer of butadiene and styrene such as the polymers described in U.S. Pat. Nos. 2,712,562; 2,791,618; 2,849,510 and 2,826,618. In reverse, the polythioethers having vinyl sulfide end groups can be reacted with tri- and/or polythiols such as the trithiolic ester derived from mercaptopropionic acid and trimethylolpropane.

Prior to curing opeartions, the addition products may be compounded with stabilizers, plasticizers or extender oils and various types of fillers. For example, carbon black, petroleum, coke or mineral fillers may be incorporated into the polymer up to about 10 parts, preferably up to 200 parts, of filler per 100 parts of polymer. Among the carbon blacks that may be compounded with the addition product polymer are the channel blacks such as ETC, MPC, HPC, etc. (these letters denoting carbon black products well known to the trade), the furnace blacks including SRF, HAF, etc. and the thermal blacks. The mineral fillers which may be used include any of the usual noncarbon black fillers or pigments such as the oxides, hydroxides, sulfides, carbonates, and so forth of silicon, aluminum, magnesium, titanium, zinc or the like, or the silicates or aluminates of the various elements above-indicated.

The cured mastic compositions of this invention are highly resistant to ozone and oxygen degradation even at elevated temperatures and are relatively immune to atack by organic solvents. Hence, the cured materials find particular utility in automotive applications and as gasketing materials.

The invention will be further understood by reference to the following examples.

EXAMPLE 1

One gram mole (108 grams) of trimethylenedithiol was placed in a quartz pressure tube equipped with a magnetic stirrer. The tube was evacuated and 40 grams (1 gram mole) of methylacetylene was condensed therein. The reaction vessel was closed, placed in a water bath maintained at a temperature varying between 15 and 17° C., and the contents irradiated with constant stirring with a 70 watt high pressure Hanau immersion lamp. After a reaction period of 11 hours wherein the reactants were constantly agitated and subjected to ultraviolet irradiation, the reaction vessel was opened and the addition product recovered. All of the volatile starting materials and most of the volatile products were removed from the product by bubbling nitrogen for one hour through the product contained in a vessel maintained at a temperature of 150° C. and 25 millimeters of mercury. Following the distillation procedure, 134 grams (94% yield) of a polythioetherdithiol was obtained as clear, colorless, viscous liquid product.

Nuclear magnetic resonance analysis (NMR) of the product showed the presence of characteristic triplets centered at about 2.64 p.p.m. downfield from tetramethylsilane for the alpha-methylene, $SCH_2$, group; a chacteristic quintriplet centered at about 1.74 p.p.m. for the middle methylene, $CH_2$, group; and a typical doublet at 1.34 p.p.m. for the methyl group. The lack of vinylic proton signals in the NMR spectrum indicated that the polythioether was saturated (FIG. 1). The presence of the thiol groups was confirmed by potentiometric titration of the product with silver nitrate. The average molecular weight of the product as determined by low pressure osmometry in benzene solution was 1112.

On the basis of NMR analysis and molecular weight determination, the product is belived to have the following structure:

$$HS[(CH_2)_3SCH_2CHS]_3(CH_2)_3SH$$
$$\phantom{HS[(CH_2)_3SCH_2}CH_3$$

An elemental anlysis of the product also supported the assumed structure. The calculated elemental composition for $HS[(CH_2)_3SCH_2CH(CH_3)S]_6(CH_2)_2SH$ (calculated molecular weight 1146): C, 47.15; H, 8.09; S, 44.76. Found: C, 47.70; H, 8.15; S, 44.91.

EXAMPLE 2

Following the procedure of Example 1, one gram mole (94 grams) of ethanedithiol was reacted with 40 grams (1 gram mole) of methylacetylene for 33.5 hours. After heating crude product to 175° C. at 0.3 millimeter of mercury to remove the volatile reactants and products, 129 grams (96% yield) of viscous liquid polymeric product was recovered. The average molecular weight of the polymer as determined by low temperature osmometry in benzene solution was found to be 2532. From the molecular weight determination and a NMR structure analysis, the principal product was believed to have the following structural formula:

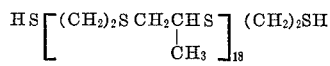

An elemental analysis of the product also supported the assumed structure. The calculated elemental composition for $C_{92}H_{186}S_{38}$ (molecular weight 2511; $n=18$): C, 44.01; H, 7.46; S, 48.53. Found: C, 44.15; H, 7.52; S, 48.73.

EXAMPLE 3

Following the procedure of Example 1, 108 grams (1 gram mole) of 1,2-propane dithiol was reacted for 48 hours with 40 grams (1 gram mole) of methylacetylene. Following the reaction, the unreacted reagents and volatile adducts were removed by a one-hour distillation at 150° C. The final product weighed 126 grams (85% yield). Its molecular weight was found to be 1604. The calculated composition for $C_{63}H_{128}S_{22}$ (molecular weight 1591; $n=10$): C, 47.56; H, 8.10; S, 44.34. Found: C, 47.36; H, 8.33; S, 43.79.

EXAMPLE 4

One-fifth molar quantities (21.6 grams each) of trimethylenedithiol were reacted with varying amounts of methylacetylene starting with an equal molar amount (8 grams) and with amounts in excess of equal molar quantities up to reactions where 100 mole percent excess of methylacetylene was used. The reaction was conducted according to the procedure described in Example 1. The viscosities of the reacting mixtures increased with increasing excess of methylacetylene indicating the direct effect of the latter on the molecular weights of the polythioethers formed.

Molecular weight determinations of the various products indicated that an excess of 20 mole percent of methylacetylene resulted in a product having a number average molecular weight of 4742. Products obtained when methylacetylene was present at 50 mole percent and 100 mole percent excess exhibited number average molecular weights of 4286 and 2532, respectively.

EXAMPLE 5

Figure 2:
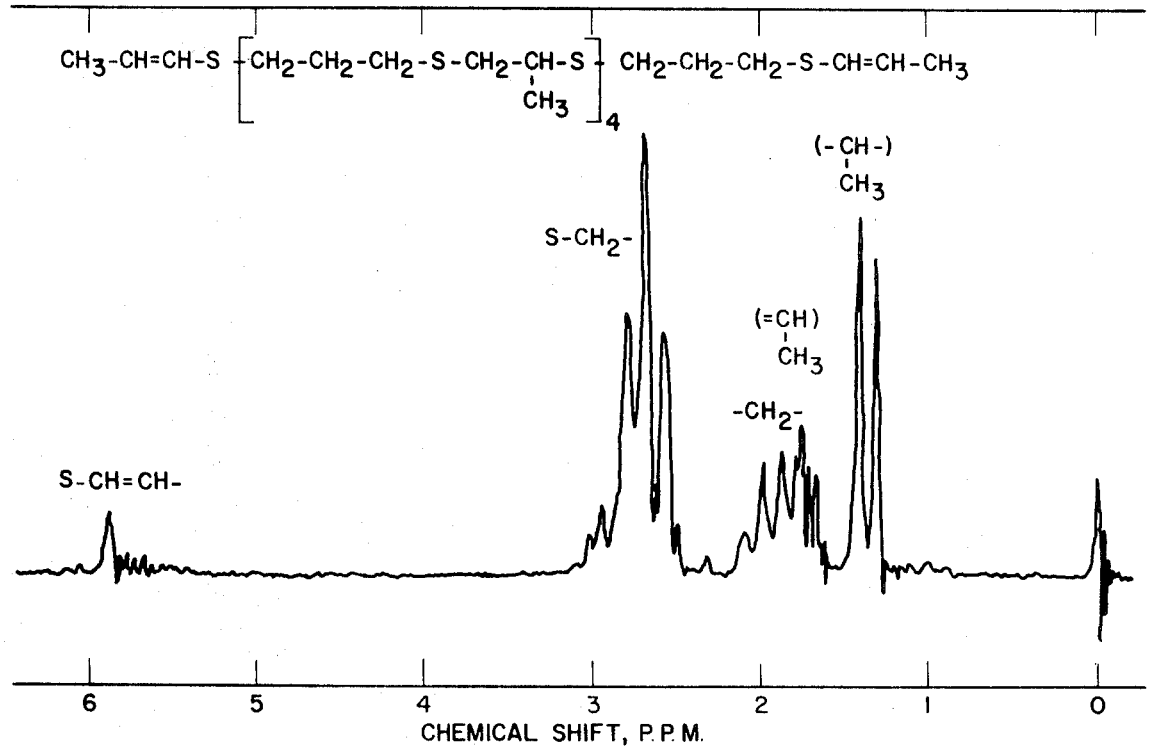

Three-tenths of a mole of trimethylenedithiol (32.4 grams) was reacted for 24 hours with a ten-fold molar excess of methylacetylene (120 grams, 3 gram moles) according to the procedure of Example 1. The resulting product was heated to 210° C. at 0.35 millimeter of mercury in a distillation apparatus to remove volatile materials. The residual product (30 grams, 86% yield) had a molecular weight of 842 as determined by low pressure osmometry. The NMR spectrum of the product (FIG. 2) showed that it had propenyl end groups as shown in the assumed product structure below.

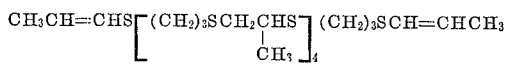

An NMR analysis of the distillate by-product (5 grams) showed that it consisted of a mixture of the following two monoadducts:

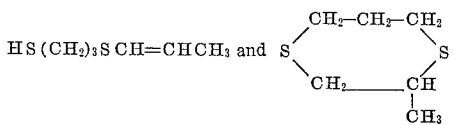

EXAMPLE 6

Into a quartz tube containing 94 grams (1 gram mole) of ethanedithiol was bubbled gaseous acetylene. The reactants were subjected to ultraviolet light irradiation and maintained at a temperature of 17° C. Acetylene addition was continued for five days. The resulting product was then heated to 115° C. at 0.3 millimeter of mercury pressure to remove unreacted dithiol. The residual product, weighing 20.5 grams was believed to be a diadduct of acetylene and ethanedithiol having the assumed structure:

$$HS(CH_2)_2S(CH_2)_2S(CH_2)_2SH$$

The structure of the above product was confirmed by NMR analysis and thiol end group titration.

EXAMPLE 7

A mixture of 86.4 g. (0.20 m) of trimethylenedithiol and 35 g. (0.875 m) of methylacetylene contained in a Pyrex pressure tube was irradiated in an aluminum vessel from 7.5 cm. distance by a $Co^{60}$ source emitting γ-rays of about 6000 Curie intensity for 30 minutes. The tube was opened and evacuated to a pressure of 30 mm. of mercury to remove the unreacted methyl acetylene. The crude product was then heated at 135° C. under 0.5 mm. of mercury pressure to remove all the volatile components. This resulted in the recovery of 107 g. (about 90% yield) of the polyadduct in the form of a colorless, viscous liquid polymer. An NMR spectrum of the product indicated that it was virtually free from vinylic unsaturation. The product exhibited a number average molecular weight as determined by the osmotic method of 4330.

EXAMPLE 8

A mixture of 64.8 g. (0.6 m) of trimethylenedithiol and 48 g. (1.2 m) of methylacetylene contained in a Pyrex pressure tube was irradiated as in the previous example with $Co^{60}$ plates for 30 minutes. Most of the excess methylacetylene was released on opening the reaction tube. The remaining unreacted material was removed on evacuation to 20 mm. of mercury leaving 92.5 g. of residual product. On heating this product at 135–138° C. under 0.15 mm. of mercury pressure, 5.8 g. of a distillate was obtained. The residue consisted of 85 g. of a colorless somewhat viscous liquid. Its NMR spectrum showed the presence of vinylic unsaturation. Its average molecular weight as determined with the osmosis method was 1170.

EXAMPLE 9

A solution of 54 g. (0.5 m) of trimethylenedithiol and 20.3 g. (0.5075 m) of methylacetylene in 53 g. methyl sulfide contained in a quartz pressure tube was irradiated by ultraviolet light at 16° C. for 3.5 hours. The solvent was then removed at 30 mm. of mercury pressure at room temperature. The remaining crude product (69 g.) was heated between 130–140° C. for 2 hours to remove the volatiles. The residual product (63 g.) was a colorless liquid of moderate viscosity having a number average molecular weight of 876.

EXAMPLE 10

A mixture of 54 g. (0.5 m) of trimethylenedithiol and 29.7 g. (0.55 m) of ethylacetylene was irradiated at 16° C. with an ultraviolet lamp in the usual manner for 18 hours. The tube was opened and evacuated to a pressure of 30 mm. of mercury resulting in the loss of 1.7 g. of unreacted ethylacetylene. The remaining crude product was heated at 140° C. under 0.2 mm. for 2 hours to remove all the volatiles. The residual product obtained consisted of 73 g. (91%) of a colorless, viscous liquid. An NMR spectrum of the product indicated no vinylic unsaturation. An osmotic molecular weight determination of the product gave a value of 3943. The calculated molecular weight of the expected polythioetherdithiol having a degree of polymerization $n$, of 23 is 3916. Calculated elemental composition for $C_{167}H_{336}S_{49}$ ($n=23$): C, 51.23; H, 8.64; S, 40.13. Found: C, 51.58; H, 8.50; S, 40.03.

EXAMPLE 11

A solution of 27 g. (1.6 m) of xylylene dimercaptan and 8.6 g. (0.215 m) of methylacetylene in 85 g. methyl sulfide, contained in a quartz pressure tube, was irradiated for 3.5 hours at 16° C. with ultraviolet light. The mixture was then washed with a 5% aqueous sodium hydroxide solution to remove the unreacted dimercaptan. The methyl sulfide phase was concentrated by distillation in vacuo and heated at 140° C. under 0.5 mm. of mercury pressure. The residual polyadduct consisted of 5 g. of a viscous yellow-orange liquid. Its NMR spectrum showed a polyadduct backbone with no unsaturation. This suggested the expected polythioetherdithiol structure. The osmotic molecular weight of the product was found to be 875.

EXAMPLE 12

To a stirred melt. mixture of 34 g. (0.2 m) of p-xylylene dimercaptan and 8.2 g. (0.1 m) of 1-hexyne, 0.75 g. (0.0048 m) of azo-bis-isobutyronitrile was added at 70° C. The mixture was heated to 80° C. where an exothermic reaction was observed. After keeping the mixture at 80° C. for 6 hours, a sample of the resulting crude product was examined by NMR spectral analysis. The spectrum failed to show any unreacted hexyne nor any vinylic monoadduct intermediate present. The position and intensity of the observed NMR peaks agreed with those expected for the adduct having the structural formula:

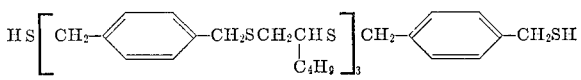

EXAMPLE 13

A mixture of 2.84 g. (0.02 m) of m-benzenedithiol and 1.64 g. (0.02 m) of hexyne was irradiated with ultraviolet light at 16° C. for 2.4 hours. The reaction mixture was sampled periodically for study by NMR. The hydrogen distribution of the samples indicated that 66% of the free thiol hydrogens disappeared during the first half hour of reaction. After 24 hours, the conversion was 80% on the basis of thiol disappearance. An NMR spectrum also showed 2 vinylic protons for every thiol proton remaining. The rest of the spectrum supported the following assumed structure:

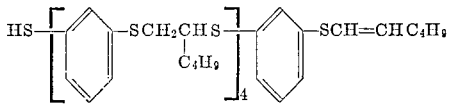

EXAMPLE 14

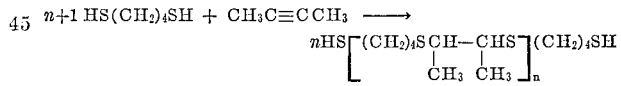

A stirred mixture of 30.5 g. (0.25 m) of tetramethylene dithiol and 14.2 g. (0.275 m) of 2-butyne was irradiated with ultraviolet light at 166° C. for 24 hours. The unconverted reactants and all other volatiles were then removed by distillation. After heating the residual product at 135° C. under 0.1 mm. pressure for 2.5 hours, 31.5 g. (71.5% yield) of slightly yellow, somewhat viscous, clear liquid polymer was obtained. NMR supported the assumed structure of the polymer repeating unit and showed no vinylic unsaturation. A molecular weight determination by osmometry gave a value of 777.

Having thus described the general nature and specific embodiments of the present invention, the true scope is now pointed out by the appended claims.

What is claimed is:

1. A process for the formation of polythioethers which comprises reacting a dithiol of the general formula HSRSH, wherein R is selected from the group consisting of (1) $C_2$–$C_{30}$ divalent alkylene radical, (2) $C_2$–$C_{30}$ unsaturated alkylene radical, (3) $C_8$–$C_{30}$ bis-alkylene substituted aromatic radical, (4) $C_6$–$C_{30}$ divalent aromatic radical, and (5) $C_2$–$C_{30}$ divalent organic radical containing an element selected from the group consisting of sulfur oxygen and silicon in addition to carbon and hydrogen atoms, with an acetylenic compound of the general formula $CR'{\equiv}CR'$, wherein R' is selected from the group consisting of hydrogen and $C_1$ to $C_{30}$ hydrocarbon radical, at a temperature in the range of from −30 to 140° C. for a time sufficient to obtain a polythioether product.

2. The process of claim 1 wherein said acetylenic compound is of the general formula CH≡CR'.

3. The process of claim 2 wherein said reaction is initiated with a free radical catalyst and said dithiol is reacted with at least an equal molar amount of acetylenic compound.

4. The process of claim 2 wherein R is selected from the group consisting of (1) $C_2$–$C_{30}$ divalent alkylene radical, (2) $C_2$–$C_{30}$ divalent unsaturated alkylene radical, (3) $C_8$–$C_{30}$ bis-alkylene substituted aromatic radical, (4) $C_6$–$C_{30}$ divalent aromatic radical, and (5) $C_2$–$C_{30}$ divalent organic radical containing an element selected from the group consisting of sulfur oxygen, and silicon in addition to carbon and hydrogen atoms and R' is selected from the group consisting of (1) hydrogen radical, (2) $C_1$–$C_{30}$ alkyl radical, (3) $C_2$–$C_{20}$ alkenyl radical, (4) $C_2$–$C_{30}$ alkynyl radical and (5) $C_7$–$C_{20}$ aralkyl radical.

5. The process of claim 2 wherein R is an alkylene radical having from 2 to 4 carbon atoms and R' is an alkyl radical having from 1 to 4 carbon atoms.

6. The process of claim 2 wherein said acetylenic compound is methylacetylene.

7. The process of claim 2 wherein said dithiol compound is trimethylenedithiol.

8. The process of claim 2 wherein R is xylylene and R' is methyl.

9. The process of claim 5 wherein R is tetramethylene and R' is methyl.

10. The process of claim 5 wherein R is ethylene and R' is methyl.

11. The process of claim 5 wherein R is 1,2-propylene and R' is methyl.

12. The process of claim 5 wherein R is trimethylene and R' is methyl or ethyl.

References Cited

UNITED STATES PATENTS

| | | | |
|---|---|---|---|
| 2,962,457 | 11/1960 | MacKinney | 260—79 |
| 3,222,326 | 12/1965 | Brodoway | 260—79 |
| 3,270,063 | 8/1966 | Fath et al. | 260—609B |
| 3,317,919 | 5/1967 | Sander | 260—79 |
| 3,317,920 | 5/1967 | Sander | 260—79 |
| 3,325,456 | 6/1967 | Adamek et al. | 260—79.7 |
| 3,329,659 | 7/1967 | Gobran et al. | 260—79.7 |
| 3,337,487 | 8/1967 | Vandenberg | 260—79 |

DONALD E. CZAJA, Primary Examiner

M. I. MARQUIS, Assistant Examiner

U.S. Cl. X.R.

204—159.11; 260—41, 77.5, 609, 887